United States Patent
Watt

(10) Patent No.: US 7,198,052 B2
(45) Date of Patent: Apr. 3, 2007

(54) MOBILE FLUSHING UNIT AND PROCESS

(75) Inventor: John Watt, Caerphilly (GB)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/799,485

(22) Filed: Mar. 12, 2004

(65) Prior Publication Data

US 2005/0199270 A1    Sep. 15, 2005

(51) Int. Cl.
*B08B 9/02*    (2006.01)
(52) U.S. Cl. ............. 134/22.1; 134/166 C; 134/167 C; 134/168 C; 134/169 A; 134/169 C; 134/169 R; 134/10; 134/22.11; 134/22.12; 134/22.13; 134/22.17; 134/22.18; 134/26; 134/29; 134/34; 134/36; 134/42; 134/140; 134/141
(58) Field of Classification Search ............ 134/168 C, 134/167 C, 169 R, 169 A, 169 C, 166 C, 134/140–141, 10, 22.1, 22.11, 22.12, 22.13, 134/22.18, 22.17, 26, 29, 34, 36, 42
See application file for complete search history.

(56) References Cited

U.S. PATENT DOCUMENTS

| | | | | |
|---|---|---|---|---|
| 2,650,602 A | * | 9/1953 | Hoke | 134/112 |
| 3,022,791 A | * | 2/1962 | Larson | 134/70 |
| 3,094,131 A | * | 6/1963 | Williams | 134/98.1 |
| 3,335,916 A | * | 8/1967 | Juniper | 222/608 |
| 3,350,223 A | * | 10/1967 | Monteath, Jr. | 134/22.17 |
| 3,844,110 A | * | 10/1974 | Widlansky et al. | 60/39.08 |
| 3,954,611 A | | 5/1976 | Reedy | 210/71 |
| 4,059,123 A | * | 11/1977 | Bartos et al. | 134/102.2 |
| 4,452,037 A | | 6/1984 | Waddington et al. | 60/39.08 |
| 4,713,120 A | * | 12/1987 | Hodgens et al. | 134/3 |
| 5,109,880 A | * | 5/1992 | Booth | 134/108 |
| 5,154,048 A | | 10/1992 | Ponziani et al. | 60/39.161 |
| 5,232,513 A | * | 8/1993 | Suratt et al. | 134/21 |
| 5,319,920 A | | 6/1994 | Taylor | 60/39.08 |
| 5,339,845 A | | 8/1994 | Huddas | 134/169 |
| 5,679,174 A | * | 10/1997 | Buongiorno | 134/22.18 |
| 5,845,684 A | * | 12/1998 | Fletcher et al. | 141/98 |
| 5,921,213 A | * | 7/1999 | Grigorian et al. | 123/196 A |
| 6,185,925 B1 | | 2/2001 | Proctor et al. | 60/39.75 |
| 6,394,108 B1 | * | 5/2002 | Butler | 134/22.18 |
| 2003/0209256 A1 | * | 11/2003 | Tadayon | 134/10 |

(Continued)

FOREIGN PATENT DOCUMENTS

WO    WO-01/91930 A1    12/2001

*Primary Examiner*—Sharidan Carrillo
(74) *Attorney, Agent, or Firm*—Harrington & Smith, PC

(57) ABSTRACT

In one embodiment of the invention, a method of cleaning a workpiece is disclosed. The method comprises providing a mobile flushing unit and servicing the workpiece as follows: a) connecting a flexible hose of the mobile flushing unit to one end of the workpiece and connecting another flexible hose of the mobile flushing unit to a second end of the workpiece; b) flowing compressed air through each hose and the workpiece; c) pumping a cleaning fluid through each hose and the workpiece for a predetermined amount of time; d) ceasing cleaning fluid flow, followed by purging with air to remove the cleaning fluid from the workpiece; e) pumping water through each hose and the workpiece for a predetermined amount of time; f) ceasing water flow, following by another purge with air to remove the water from the workpiece; and g) disconnecting each hose from the workpiece.

3 Claims, 4 Drawing Sheets

U.S. PATENT DOCUMENTS

2004/0007255 A1    1/2004   Labib et al. .................. 134/30
2004/0065347 A1*  4/2004   Awad ........................... 134/18
2004/0200506 A1*  10/2004  Mooney ..................... 134/22.11

* cited by examiner

MOBILE FLUSHING UNIT AND PROCESS

FIELD OF THE INVENTION

The present invention generally relates to cleaning processes, including those employed in gas turbine engine overhaul processes. More particularly, this invention relates to an apparatus and process for cleaning oil scavenge tubes of a turbine rear frame.

BACKGROUND OF THE INVENTION

Modern gas turbine engines, such as the General Electric CFM56-5B and -7B with dual annular combustor engines, have been designed to operate both efficiently and with low amounts of pollution emissions. The engines typically include lubrication systems in which lubricating oil is carried externally of the engine in a separate tank or reservoir. In some modern gas turbine engines, the bearing assemblies are lubricated with oil, and heat from the engine parts is absorbed and dissipated by the same oil. It is known to house the engine bearing assemblies in their own respective sumps. The major components of a dry sump lubrication system include a lubricating oil reservoir or tank, a supply pump for supplying lubricating oil from the reservoir to the bearing assembly sumps under pressure and a scavenge pump for removing lubricating oil from the bearing assembly sumps. The scavenge pump causes the return lubrication oil to pass through a heat exchange assembly, on its way to the tank or reservoir. The heat exchange assembly often puts the return lubrication oil in heat exchange with the jet fuel used by the engine. Fuel, on its way to the combustor, enters and passes through the heat exchanger at a much greater flow rate than the oil, so that large quantities of heat are absorbed from the oil by the fuel. Appropriate filter means are also included in the system to remove contaminants from the oil.

The system also includes the necessary lubrication and scavenge tubes. The lubrication and scavenge tubes are often secured to the engine cases, frames, ducts, etc. by clamps and brackets. These lubrication and scavenge tubes run from the pumps to the turbine rear frame.

A problem sometimes encountered is heavy coking and blocking of the oil scavenge tubes on the turbine rear frame. This problem may be addressed by stripping the turbine rear frame, including the scavenge tube, off of the low pressure turbine module for cleaning, as the scavenge tube cannot be remove or flushed in situ. During this cleaning, the turbine rear frame may be positioned horizontally and the scavenge tube then blocked at one end. Cleaning fluid may then be manually poured into the tube and after an appropriate amount of time the fluid may be eliminated from the tube. This process may be repeated for several hours, even days, until the tube is cleared of the blockage. Although this cleaning process may be effective, it is often costly and time consuming.

Accordingly, there exists a need for effective cleaning processes for cleaning tubes, cavities or similar bodies. There is also a particular need for a process and apparatus for cleaning oil scavenge tubes of gas turbine engine components, particularly oil scavenge tubes of a turbine rear frame. The present invention satisfies these needs.

BRIEF DESCRIPTION OF THE INVENTION

In one embodiment of the invention, a method of cleaning a workpiece is disclosed. The method comprises providing a mobile flushing unit and servicing the workpiece as follows: connecting a flexible hose of the mobile flushing unit to one end of the workpiece and connecting another flexible hose of the mobile flushing unit to a second end of the workpiece; flowing compressed air through each hose and the workpiece; pumping a cleaning fluid through each hose and the workpiece for a predetermined amount of time; ceasing cleaning fluid flow, followed by purging with air to remove the cleaning fluid from the workpiece; pumping water through each hose and the workpiece for a predetermined amount of time; ceasing water flow, following by another purge with air to remove the water from the workpiece; and disconnecting each hose from the workpiece.

In another embodiment of the invention, a mobile flushing unit for cleaning a workpiece is disclosed. The mobile flushing unit comprises the following elements enclosed within a portable device: a first tank for holding a cleaning fluid; a second tank for holding water; flexible hoses for connection to ends of the workpiece; a heater for heating the first tank to a desired temperature; a filtration system to collect debris removed from the workpiece. The unit further comprises an air supply; and a pump, valve and conduit system coupling the elements for selective: connection to and flowing of compressed air through the hoses and the workpiece; pumping of the cleaning fluid through the hoses and the workpiece for a predetermined amount of time; ceasing of cleaning fluid flow, followed by purging with air to remove the cleaning fluid from the workpiece; pumping of water through the hoses and the workpiece for a predetermined amount of time; ceasing of water flow, followed by another purge with air to remove the water from the workpiece. Advantageously, debris removed from the workpiece is collected by a filter of the filtration system.

DETAILED DESCRIPTION OF THE INVENTION

Although the present invention will be described with respect to the cleaning of an oil scavenge tube of a gas turbine engine component rear frame, it is understood that the invention is applicable to clean any suitable workpiece requiring a cleaning. For example, other gas turbine engine components, such as the internal features of blades and vanes, may be cleaned with the processes and apparatuses described herein. Similarly, any other suitable workpiece or component having a cavity in need of such cleaning may be employed. For example, embodiments of the invention may be employed to clean automotive components, including engines and manifolds, among other workpieces.

Figure 1:
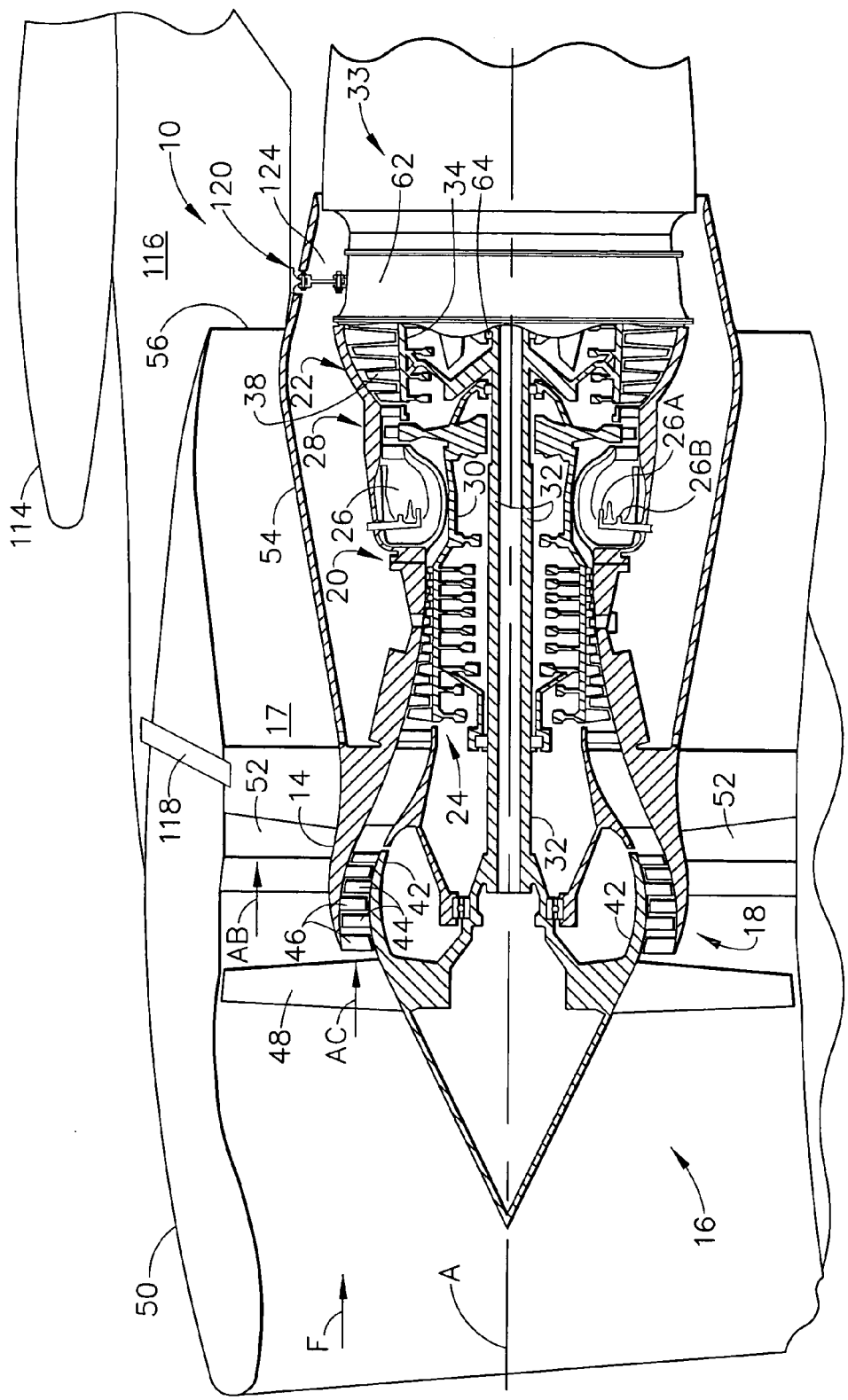
FIG. 1 is a schematic cross-sectional view of a gas turbine engine having a rear turbine frame and mounted to a pylon below an aircraft wing by an aft engine mount.

Referring to FIG. 1, there is shown a gas turbine engine, generally designated 10. The engine 10 has a longitudinal centerline A and an annular casing 14 disposed coaxially and concentrically about the centerline A. Air enters the engine 10 in a downstream axial direction F through a forward fan 16 and is then split into fan bypass air AB through a fan bypass 17 and core air AC through a booster compressor 18 (also referred to as the low pressure compressor). A core engine 20 receives the core air from the AC booster compressor 18 and sends it through a multi-stage high pressure compressor 24, a dual annular combustor 26, with radially inner and outer rows of fuel injectors 26A and 26B, respectively, and a high pressure turbine 28, either single or multiple stage, all arranged coaxially about the centerline A of the engine 10 in a serial flow relationship. A high pressure shaft 30 fixedly interconnects the high pressure compressor 24 and high pressure turbine 28 of the core engine 20. The high pressure compressor 24 is rotatably driven by high pressure turbine 28 to compress air entering the core engine 20 to a relatively high pressure. The high pressure air is then mixed with fuel in the combustor 26 and ignited to form a high energy gas stream. This gas stream flows aft and passes through the high pressure turbine 28, rotatably driving it and the high pressure shaft 30 of the core engine 20 which, in turn, rotatably drives the multi-stage high pressure compressor 24.

The gas stream discharged by the core engine high pressure turbine 28 is expanded through a low pressure turbine, which drives the forward fan 16 and the booster compressor 18 via a low pressure shaft 32 extending forwardly through the annular high pressure shaft 30. Some thrust is produced by the residual gas stream exiting the core engine 20 through a core engine or primary nozzle 33 aft of low pressure turbine 22, but most of the thrust power is generated by the forward fan 16.

The low pressure turbine 22 includes an annular rotatable low pressure turbine rotor 34 having a plurality of turbine blade rows 38 extending radially outwardly therefrom and axially spaced from one another. A plurality of stator vane rows 40 are fixedly attached to and extend radially inwardly from the stationary casing 14. The stator vane rows 40 are axially spaced so as to alternate with the turbine blade rows 38 and define therewith multiple stages of the low pressure turbine 22.

The booster compressor 18 is driven by the low pressure turbine 22 via the low pressure shaft 32. The booster compressor 18 includes a booster rotor 42 and a plurality of low pressure compressor or booster blade rows 44 fixedly attached to and extending radially outwardly from the booster rotor 42 for rotation therewith. A plurality of booster stator vane rows 46 are fixedly attached to and extend radially outwardly from the booster rotor 42 for rotation therewith. A plurality of booster stator vane rows 46 are fixedly attached to and extend radially inwardly from the stationary casing 14. Both the booster blade rows 44 and the booster stator vane rows 46 are axially spaced and so arranged to alternated with one another.

The booster rotor 42 also supports a fan blade row 48 of the forward fan 16. The fan blade row 48 is housed within a nacelle 50 of the engine 10 supported about the stationary casing 14 by a plurality of radially extending and circumferentially spaced fan struts 52. An engine cowling 54, which encloses the core engine 20 and the low pressure turbine 22 is disposed within and extends coaxially with a rear portion of the nacelle 50 so as to define therewith a fan discharge nozzle 56. Most of the thrust produced by the engine 10 is generated by air flow caused by rotation of the fan blade row 48 of the forward fan 16, which air flow passes over and through the nacelle 50.

Figure 2:
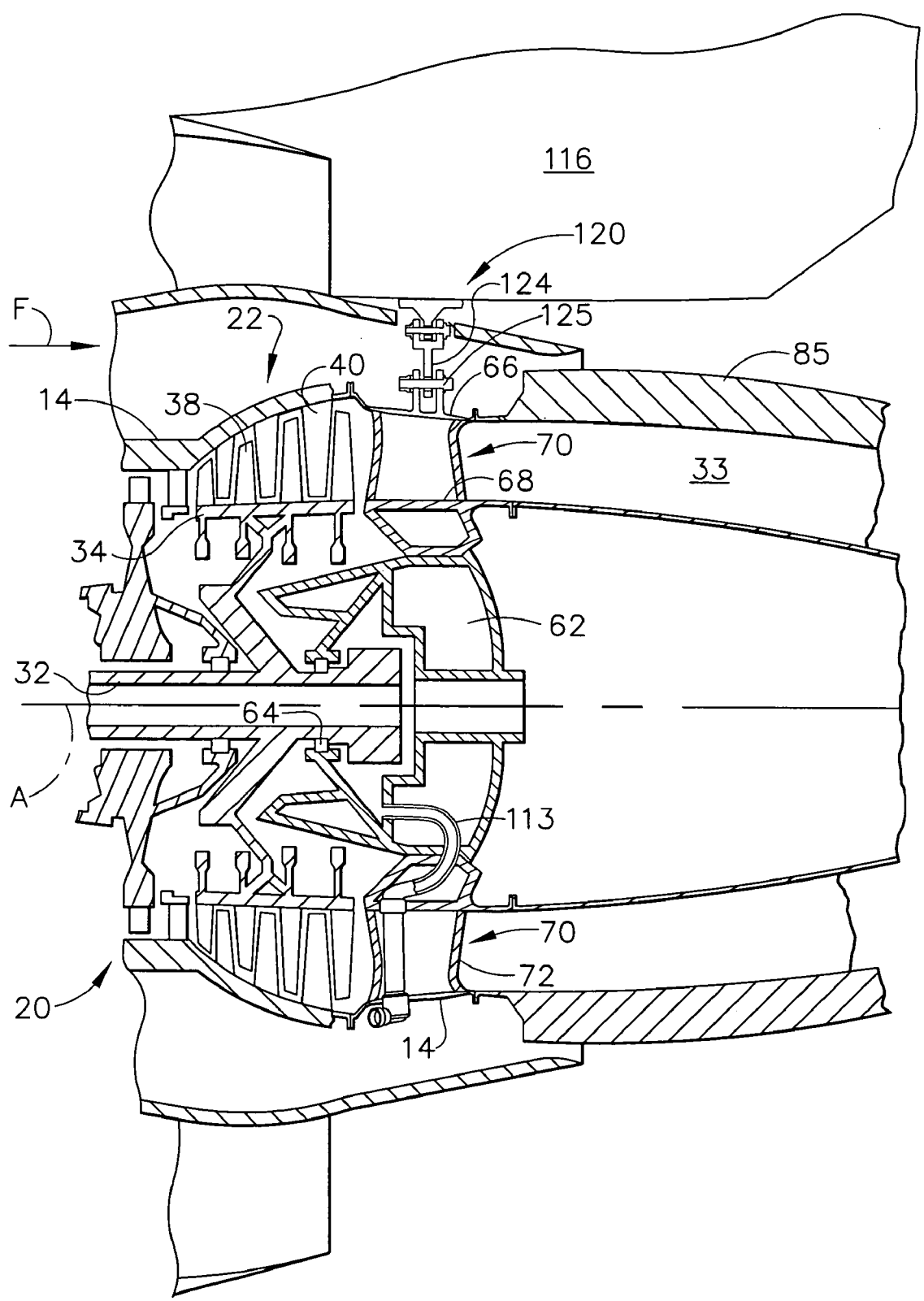
FIG. 2 is an enlarged cut-away schematic view of a portion of the engine illustrated in FIG. 1.

The low pressure turbine 22 includes an annular rear turbine frame 62, which supports a conventional bearing 64 which, in turn, rotatably supports an aft end of the low pressure shaft 32. The rear turbine frame 62 includes a radially outer first structural ring 66 disposed coaxially about the centerline A and a radially inner second structural ring 68. A plurality of circumferentially spaced apart struts 70 extend radially between the first and second structural rings 66 and 68 and are fixedly joined thereto. Each one of the struts 70 is conventionally surrounded by a conventional fairing 72 for protecting the struts from combustion gases flowing through the turbine frame 62, as shown in FIG. 2. An oil scavenge tube 113 is secured to casing 14.

As also shown in FIG. 1, the engine 10 is mounted below an aircraft wing 114 by a pylon 116 at a conventional forward mount 118, shown in dashed line, and an aft mount 120 spaced axially downstream from the forward mount 118. The aft mount 120 fixedly joins the rear turbine frame 62 of the engine 10 to a platform 124, which is fixedly joined to the pylon 116. The aft mount 120 includes a circumferentially spaced apart conventional first set of U-shaped devises (not shown) on the rear turbine frame 62 connected by a first set of pins 125 to a set of first links (not shown). Each of the first links has second devises connected by a second set of pins to lugs that depend radially inward from the platform (not shown).

After extended operation of the gas turbine engine, coking and blocking of the afore-described oil scavenge tubes may occur. Accordingly, it is desirable to periodically clean these tubes.

Figure 3:
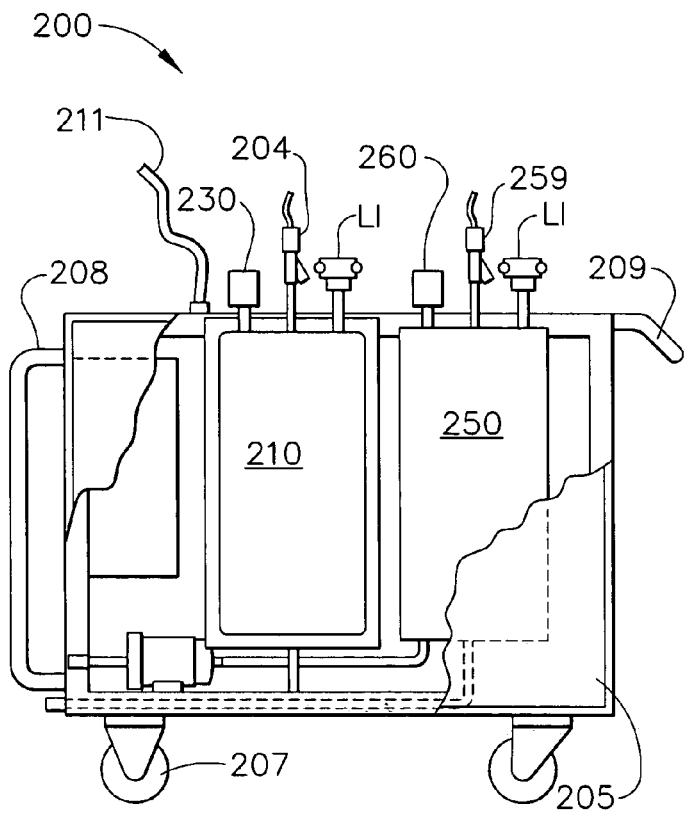
FIG. 3 schematically illustrates an embodiment of the present invention.

According to embodiments of the present invention, the oil scavenge tubes may be efficiently and economically cleaned to remove the coking and blockage of the tubes. In one embodiment, a mobile flushing unit 200 is provided, as shown in FIG. 3. The portable unit 200 may efficiently and economically be used to flush coked scavenged tubes of a turbine rear frame of CFM engines, or others, whether the tubes are built on and remain on the engine or disassembled therefrom, such as by removal of the turbine rear frame from the low pressure turbine. Similarly, unit 200 may be used to clean any other suitable workpiece in need of cleaning.

As shown in FIG. 3, the unit 200 comprises a trolley 205 for housing the various elements contained therein. Preferably the trolley is made of a stainless steel material and has at least one removable side panel for equipment access. Preferably, the trolley 205 encloses the elements of the apparatus such that any leak will be contained inside the trolley 205 and that no operator may be exposed to any hot internal tank surface. The trolley 205 may be made of any suitable size and shape, and preferably has a plurality of wheels 207 and at least one hand rail 209, as shown in FIG. 3, for ease of mobility. Advantageously, the unit 200 may be easily transported by an operator to the desired cleaning location. The trolley 205 may further include a bump rail 208, as also shown in FIG. 3. While the mobile unit 200 has been described with respect to transport by a trolley 205, it is understood that other types of transport vehicles may be employed.

As shown in FIG. 3, the unit 200 further comprises flexible hoses 211 for connection to a scavenge oil tube inlet and outlet. The flexible hoses 211 may be made of any suitable material, including flexible polymeric material. The lengths of the hoses 211 may also be of any suitable length, depending upon, for example, the size of the workpiece to be cleaned and the distance from the unit 200 to the workpiece, as one skilled in the art would recognize. Advantageously, the ends of the hoses 211 may be modified to conform to the particular workpiece in need of cleaning. For example, clamping or other suitable devices may be secured to the ends to create an effective seal.

The unit 200 also comprises a first tank 210 for the active cleaning fluid and a water tank 250, as shown in FIG. 3. Preferably, the first tank 210 is a stainless steel tank capable of holding about 25 to about 50 liters or other suitable amount of alkaline material, such as Ardrox 1618 cleaning fluid, or other suitable cleaning fluid. Ardrox 1618 cleaning fluid is an alkaline cleaning solution effective in dissolving carbon and is sold by Chenetal Co. Other suitable cleaning fluids include any conventional cleaning fluids capable of dissolving carbon materials or other materials desired to be removed and may also include acidic cleaning solutions depending upon the desired application.

The tank 210 is preferably fitted with a heater 204 and the contents heated to a suitable temperature, which is typically dependent upon the cleaning fluid employed in the tank 210. For example, the tank 210 preferably may be heated to about 85° C. when Ardrox 1618 alkaline cleaning fluid is employed. Tank 210 may further include a level indicator LI to ensure that the tank 210 is operating at the correct level, a temperature probe (not shown) rated for the desired temperature, a breather 230 with activated filter, such as a charcoal filter, and heater element 204.

Connected to tank 210 is water tank 250, as also shown in FIG. 3. Preferably, water tank 250 is a stainless steel tank capable of holding about 25 liters to about 50 liters of water or other suitable amount. Water tank 250 is preferably fitted with a level indicator LI to ensure correct water level, a breather 260 with activated filter, such as a charcoal filter, and a heater element 259.

Figure 4:
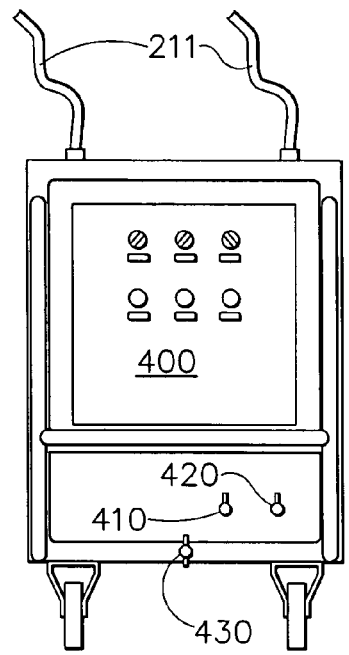
FIG. 4 is a side view of a portion of the apparatus illustrated in FIG. 3.

As shown in FIG. 4, the unit 200 may further comprise a control enclosure panel 400 exposing the various control mechanisms for operation of the unit 200. Drains 410 and 420 may also be provided on the unit 200 for the draining of cleaning fluid and water, as desired. Similarly, a sump drain 430 may be provided on the unit for use with a sump for effective draining operation.

Figure 5:
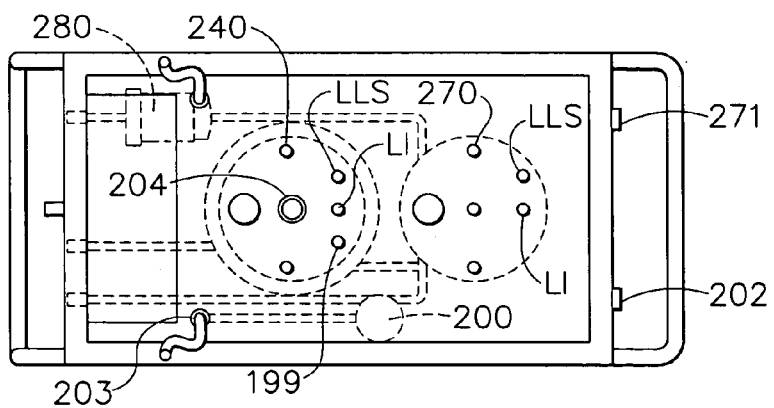
FIG. 5 is a top view of a portion of the apparatus illustrated in FIG. 3.

In an embodiment of the invention shown in FIG. 5, the unit 200 may comprise a pump 280, low level sensor LLS, cleaning fluid or auto top up 240, water top up 270, electrical supply connection 271, low level sensor LLS, level indicator LI, compressed air supply connection 202, in line return filter 200, thermocouple 199, heater element 204 and return 203.

Figure 6:
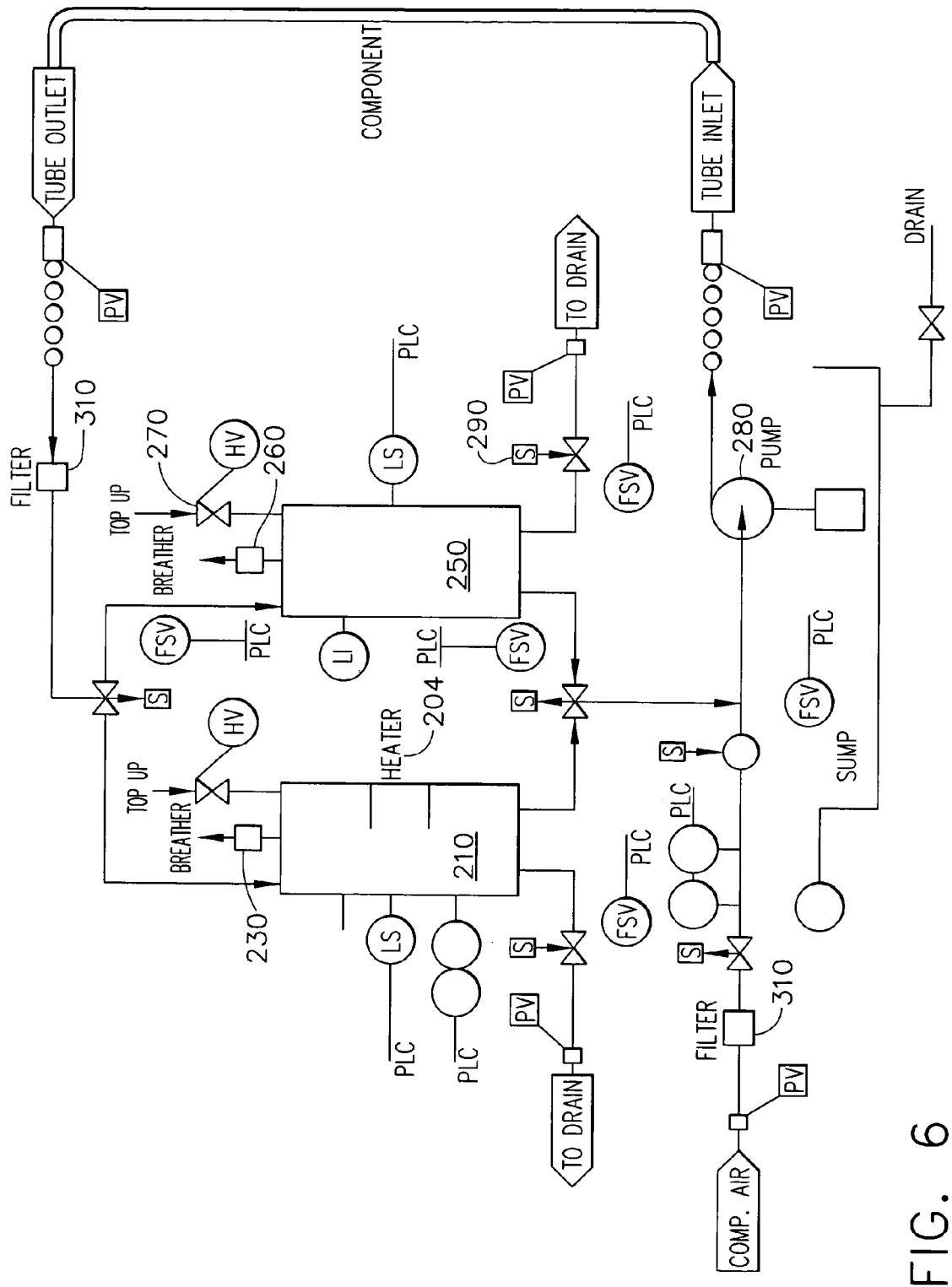
FIG. 6 is a diagrammatic view illustrating the interconnection of the various elements of an embodiment of the invention.

As also shown in FIG. 6, control solenoid valves 290 may be employed to open/close values to select the cleaning fluid or water. Similarly, control solenoid valves 300 may open/close air purge on the tubes, as desired. A filtration system 310 may collect any debris in the return pipes from the cleaning fluid and water tanks, 210, 250. As also shown in FIG. 6, unit 200 may further comprise a header tank 320 with water to top up the tank 210 and water tank 250. Preferably a PLC computer control system is used to monitor the liquid level in each tank, and monitor the temperature of cleaning fluid and the switch selection from cleaning fluid to water. The interconnection of the various elements of an embodiment of the invention are also set forth in FIG. 6, including various level sensors LS, pressure valves PV, safety valves FSV, switches S and header valves HV.

The duration of cleaning cycle typically depends upon the amount of build up in the workpiece, as would be recognized by one skilled in the art. For example, a heavily coked oil scavenge tube may require about 1–2 hours of cleaning, whereas a component that is not excessively coked may only require about 15 minutes of the cleaning cycle. A bore scope may be employed to monitor the cleaning process.

An embodiment of the present invention will be now described by way of a flow chart example, which is meant to be merely illustrative and therefore not limiting.

EXAMPLE

Connect unit to 230 vac single phase socket by 13 Amp plug, connect to compressed air supply
System checks cleaning fluid level and water level, level probes provide feed back and auto top up operates, if necessary
Heat up cleaning fluid tank to 85° C., temperature probe provides feedback of PLC when desired temperature is achieved
Connect flexible hoses to each end of the oil scavenge tube on the aircraft engine (this operation may be carried out with use of a fitter to ensure correct connection of the fittings)
System will give an initial air purge to blow all lines with clean air and then return valves closes, system builds up to 20 psi air pressure, and check for any leaks
Confirm no leaks, and press button on control panel to confirm successful test
Select cleaning fluid on control panel and then cycle start
Cleaning fluid will circulate through lines for predetermined period of time
At end of clean cycle, cleaning fluid valve closes and automatic air purges lines to remove as much cleaning fluid as possible
Select water rinse on control panel and then cycle start
Water will circulate through lines for predetermined period of time
At end of clean cycle, water valve closes and automatic air purges lines to remove as much water as possible
Disconnect flexible hoses from oil scavenge tube on aircraft engine (or tube removed from engine)
Disconnect electric and air supply from trolley An advantage of embodiments of present invention is providing a portable cleaning apparatus useful in efficiently and cost effectively cleaning tubes, cavities and other openings on various workpieces, included gas turbine engine components. Embodiments of the invention are particularly useful in removing coking and blockage of oil scavenge tubes on turbine rear frames of gas turbine engine components. However, embodiments of the invention may be adapted to clean any component or article requiring such a cleaning operation. Another advantage is that operators also may be readily trained in the automated cleaning process.

While various embodiments are described herein, it will be appreciated from the specification that various combinations of elements, variations or improvements therein may be made by those skilled in the art, and are within the scope of the invention.

What is claimed is:

1. A method of cleaning an oil scavenge tube of a gas turbine engine to remove debris comprising:

providing a gas turbine engine comprising a fan, a plurality of compressors, a combustion chamber, and a turbine including an annular rear turbine frame supporting a bearing which rotatably supports an aft end of a shaft, the engine also including an oil scavenge tube of the turbine rear frame, wherein the gas turbine engine has been in service and the tube includes debris as a result of this operation of the gas turbine engine; and providing a mobile flushing unit and cleaning the oil scavenge tube of the gas turbine engine, as follows:

connecting two flexible hoses to the oil scavenge tube by connecting one flexible hose of the mobile flushing unit to one end of the tube and connecting another flexible hose of the mobile flushing unit to a second end of the tube, wherein only two hoses are connected to the tube, and each hose has only one opening at each end and is connected to each end of the oil scavenge tube such that fluid circulates through the hoses;

flowing compressed air through each hose and the tube for a predetermined amount of time;

pumping a cleaning fluid through each hose and the tube for a predetermined amount of time;

ceasing the cleaning fluid flow, followed by purging with the air to remove the cleaning fluid from the tube;

pumping water through each hose and the tube for a predetermined amount of time;

ceasing water flow, followed by another purge with the air to remove the water from the tube; and disconnecting each hose from the tube, wherein the debris is removed from the tube and the gas turbine engine component is repaired.

2. The method of claim 1, wherein the cleaning fluid is an alkaline fluid.

3. The method of claim 1, wherein debris cleaned from the oil scavenge tube is filtered through a filtration system.

* * * * *